United States Patent [19]

Fannin et al.

[11] 3,887,489

[45] June 3, 1975

[54] RHODIUM CATALYST REGENERATION METHOD

[75] Inventors: Loyd W. Fannin, Dickinson, Tex.; Victor D. Phillips, Jr., Ballwin, Mo.; Thomas C. Singleton, Texas City, Tex.

[73] Assignee: Monsanto Company, Texas City, Tex.

[22] Filed: Nov. 24, 1972

[21] Appl. No.: 309,560

[52] U.S. Cl. ............... 252/413; 252/414; 252/415; 252/441; 260/465.4; 260/485 R; 260/413; 260/514 M; 260/515 R; 260/526 R; 260/532; 260/533 A; 423/22
[51] Int. Cl. ... B01j 11/80; C07c 31/14; C08h 17/36
[58] Field of Search .......... 252/414, 415, 412, 413; 260/532 R, 514 M, 413, 604 HF; 423/22

[56] References Cited
UNITED STATES PATENTS

| | | | |
|---|---|---|---|
| 2,839,580 | 6/1958 | Hughes et al. | 260/604 HF |
| 2,880,241 | 3/1959 | Hughes | 260/604 HF |
| 3,220,957 | 11/1965 | Hoff et al. | 252/414 |
| 3,579,552 | 5/1971 | Craddock et al. | 260/413 |
| 3,636,034 | 1/1972 | Ohsumi et al. | 260/638 HF |

FOREIGN PATENTS OR APPLICATIONS

| | | | |
|---|---|---|---|
| 1,290,535 | 3/1969 | Germany | 260/604 HF |
| 1,295,537 | 5/1969 | Germany | 260/604 HF |

*Primary Examiner*—Winston A. Douglas
*Assistant Examiner*—P. E. Konopka
*Attorney, Agent, or Firm*—Elizabeth F. Sporar

[57] ABSTRACT

Method for treating spent catalyst solution comprising the complex reaction product formed on mixing of a rhodium component and a halogen component in the presence of carbon monoxide to remove metallic corrosion products and recover rhodium and halogen values therefrom.

6 Claims, No Drawings

RHODIUM CATALYST REGENERATION METHOD

BACKGROUND OF THE INVENTION

The present invention relates to an improvement in the process for production of carboxylic acids, esters and anhydrides by carbonylation in the presence of catalyst complex systems comprising a rhodium-containing component and a halogen component. More particularly, it relates to a method for regenerating the metal catalyst complex employed in such processes.

A process has been recently been developed for the preparation of carboxylic acids, esters and anhydrides by the reaction of olefins, alcohols or esters or ethers and halide derivatives thereof with carbon monoxide in contact with catalyst systems formed on mixing of a rhodium component and a halogen component in the presence of carbon monoxide. This process is described, for example, in U.S. Pat. No. 3,579,552 and Belgian Pat. No. 713,296. A hydrogen halide or an alkyl halide, notably hydrogen iodide or an alkyl iodide, is usually employed as the halogen component in these catalyst systems. The catalyst itself is self-regenerative. In operation of the process on a continuous basis, a solution containing the soluble catalyst complex is separated from the reactor effluent and recycled to the reactor. However, with operation over extended periods of time, corrosion products, namely, iodides of iron, nickel, molybdenum, chromium and the like form and build up in this catalyst recycle stream. Such foreign metals, if present in sufficient quantity, are known to accelerate competing reactions such as the water-gas reaction (carbon dioxide and hydrogen formation) and methane formation. These have an adverse effect on the process in that they cause a decrease in the partial pressure of carbon monoxide in the reactor resulting in loss in yield based on carbon monoxide. Further, foreign metals present can react with ionic iodine thus making this component of the catalytic system unavailable for reaction with rhodium. In view of the high cost of the rhodium-containing catalyst complex, replacement of spent catalyst complex can be effected only at a prohibitive cost. Consequently, a method for regeneration of the catalyst complex is not only desirable but necessary. It is an object of the present invention, therefore, to provide a method for treating spent catalyst solution to remove metallic corrosion products therefrom and to recover the valuable rhodium metal component in a form suitable for return to the process as active catalyst complex.

Another object of the invention is to provide for recovery of halogen values from said spent catalyst solution.

SUMMARY OF THE INVENTION

According to the process of the present invention, a spent catalyst solution comprising the complex reaction product of a rhodium component, a halogen component and carbon monoxide and containing metallic corrosion products is heated in a suitable vessel provided with an agitator to a temperature from about 100° to about 190° C at a pressure sufficient to boil the solution for the period of time required to drive off carbon monoxide, precipitate the rhodium component and reduce the rhodium content of the solution to a predetermined level. The solid precipitate is separated from the liquid solution containing the metallic corrosion products and higher boiling materials. The precipitated rhodium component is then converted to active catalyst by adding a quantity of a suitable solvent such as water, acetic acid, or mixtures of water and acetic acid together with a halogen component to the vessel and heating the resulting solution under carbon monoxide pressure and constant agitation. Make-up rhodium metal can be added to this solution in the form of any of a number of rhodium compounds and dissolved during this same step.

For more efficient recovery of rhodium values, the liquid solution separated from the precipitated rhodium component is passed through an apparatus such as a cyclone separator for removal of any fine particles of the rhodium-containing precipitate which may still be contained therein. The finely divided solids collected are then combined with the precipitated rhodium component prior to its conversion to active catalyst. The liquid from the separator can be sent to a vessel for boiling down to concentrate any remaining soluble rhodium component. The concentrate, depending upon its rhodium content, can either be discarded or can be reprocessed for recovery of the rhodium values therefrom.

In another embodiment of the invention, the precipitation step is speeded up and more efficient precipitation of rhodium is effected by addition of an alkyl alcohol in which the alkyl group contains from 1 to 5 carbon atoms, preferably methanol, to the vessel prior to the heating step and then boiling out of the alkyl halide formed through a condenser for recovery and re-use as the halogen component of the catalyst system. When an alcohol is used, the temperature employed must be at least about 140° C.

DESCRIPTION OF THE PREFERRED EMBODIMENTS

The invention is illustrated in the following examples, which, however, are not to be construed as limiting it in any manner whatsoever.

EXAMPLE 1

The regeneration of spent catalyst solution was carried out in the laboratory in a round-bottomed flask equipped with a magnetic bar stirrer, a thermometer and a reflux condenser. The flask was heated externally by means of a heating mantle. A sample (approximately 200 ml) of spent catalyst solution containing soluble rhodium iodocarbonyl complex, hydrogen iodide, water, acetic acid and metal-containing corrosion products was introduced into the flask. This sample was obtained from a reactor constructed of an alloy of nickel in which acetic acid was produced continuously by reacting carbon monoxide with methanol in contact with a catalyst complex obtained by reacting rhodium triiodide, hydrogen iodide and carbon monoxide. The flask was heated to bring the contents to boiling temperature at atmospheric pressure and was maintained under reflux conditions thereafter by using tap water as the condenser coolant for a period of about 22 hours. During this time, temperature was maintained in the range from about 103° to about 108° C. At the end of the heating period the contents of the flask were allowed to cool and settle. After most of the solids had settled to the bottom of the flask, the supernatant liquid was removed by decanting and analyzed for any metal components dissolved therein. Results of these analyses together with the initial metals analysis of the catalyst solution charged to the flask are presented in Table 1.

TABLE 1

|    | Charge            |            | Decanted Liquid   |            |
|----|-------------------|------------|-------------------|------------|
|    | Analysis (ppm)    | Weight (g) | Analysis (ppm)    | Weight (g) |
| Rh | 364               | 0.083      | 33                | 0.0074     |
| Fe | 1520              | 0.347      | 1529              | 0.342      |
| Ni | 2182              | 0.497      | 2185              | 0.342      |
| Cr | 896               | 0.204      | 913               | 0.204      |
| Mo | 461               | 0.105      | 455               | 0.102      |

Calculations based on these data show that 91% of the rhodium fed to the flask was recovered and that approximately 90% of each of the corrosion metals was rejected in the decanted liquid.

EXAMPLE 2

Several batches of spent catalyst solution were collected from the same acetic acid process described in Example 1. The spent catalyst solution containing soluble rhodium iodocarbonyl complex, hydrogen iodide, water, acetic acid and metal-containing corrosion products was charged to a glass-lined Pfaudler kettle equipped with an agitator, mixing baffle and dip tube which served as a precipitator-dissolver. Methanol was added to the vessel which was then blocked in and heated to a temperature in the range from about 145° to 150° C and maintained at this temperature for a period of about 1 - 2 hours while the liquid was agitated. The pressure was then reduced and the vapors in the vessel vented.

The contents of the precipitator-dissolver were allowed to cool without agitation until most of the solids had settled to the bottom of the vessel. The supernatant liquid was then removed by decanting through the dip tube, cooled and passed through a cyclone separator to remove any fine solids present and collected in a vessel for concentration of the catalyst residue. The liquid was sampled and analyzed for metal components dissolved therein. Any finely divided solids trapped in the cyclone separator were returned to the precipitator-dissolver. Fresh catalyst solution containing acetic acid, water and make-up rhodium triiodide, if necessary, was added to the precipitate and the resulting mixture was then heated with stirring to 150°C. and pressured to 80 psig with CO until the rhodium was completely dissolved. The regenerated catalyst solution was cooled and recycled to the reactor in the acetic acid process. The decanted liquid collected was concentrated by distillation with the distillate being returned to the acetic acid process. The concentrated catalyst residue was discarded. The conditions employed and results obtained on processing of the several batches are summarized in Table 2 below. All parts given are parts by weight except where specified otherwise.

TABLE 2

| Batch No. | | | | 1 | 2 | 3 |
|---|---|---|---|---|---|---|
| Spent | Catalyst | Solution | Charged | 6274 | 6276 | 6442 |
| " | " | " | Rh | 2.33 | 2.12 | 2.06 |
| " | " | " | Fe | 11.23 | 10.23 | 9.89 |
| " | " | " | Cr | 6.45 | 6.44 | 5.59 |
| " | " | " | Ni | 12.35 | 7.15 | 11.05 |
| " | " | " | Mo | 2.15 | 3.95 | 3.81 |
| Total Corrosion Metals Charged | | | | 32.18 | 27.77 | 30.34 |
| Methanol | | | | 230 | 430 | 350 |
| Mole ratio - Methanol/Free HI | | | | 4:1 | 4:1 | 4:1 |
| Decanted | Liquid | | | 4976 | 3830 | 5354 |
| " | " | | Rh | 0.14 | 0 | 0.04 |
| " | " | | Fe | 7.34 | 6.07 | 6.33 |
| " | " | | Cr | 4.34 | 3.39 | 4.14 |
| " | " | | Ni | 9.48 | 7.2 | 8.10 |
| " | " | | Mo | 0.45 | 0.26 | 0.13 |
| Total | Corrosion | Metals | Rejected | 21.61 | 16.92 | 18.70 |
| " | " | " | % | 67 | 61 | 62 |
| Total Rh Recovered, % | | | | 94 | 100 | 98 |

It will be seen from the foregoing examples that not only is rhodium recovery by the process of the invention highly efficient but the percentage of rejection of foreign metals in the spent catalyst solution is quite high. The particular mode of practicing the invention depends upon whether molybdenum is present or not as one of the foreign metals and the desirability of removing it. While the addition of alcohol results in a more rapid rate of precipitation of the rhodium, and provides for recovery of halogen values, this technique does not effectively remove all of the molybdenum present, much of it remaining with the rhodium upon precipitation. Thus, if it is desired to remove molybdenum effectively, heating without the addition of alcohol is to be preferred. The faster technique can be employed, for example, to remove other contaminating metals until the molybdenum level reaches an undesirable concentration and then the alternate technique can be employed to remove the molybdenum again down to the desired level.

The invention is not to be considered as limited only to the conditions set out in the examples. Catalysts amenable to this treatment, for example, include all those containing rhodium complexes in addition to the rhodium iodocarbonyl complex species of the examples. Catalysts to which the regeneration technique is particularly applicable are those formed upon mixing of a rhodium component and an iodine component in the presence of carbon monoxide. As indicated previously, such catalysts are employed for the preparation of carboxylic acids, esters and anhydrides by the reaction of alcohols or esters or ethers or halide derivatives thereof with carbon monoxide. They are also utilized for the preparation of hydrogen iodide by the reaction of iodine with water and carbon monoxide and of alkyl iodides by the further reaction of the reaction mixture containing hydrogen iodide with an alcohol and in other reactions. They can occur by in situ formation in a reactor for the production of acetic acid, hydrogen iodide and other compounds or they can be prepared externally of the reactor if desired and charged as such to it. The rhodium component may be either rhodium metal itself or compounds of this metal such as salts, oxides, complexes or coordination compounds. The terms "complex" and "coordination compound" as employed herein mean a compound or complex formed by combination of one or more electronically-rich molecules or atoms capable of independent existence with one or more electronically-poor molecules or atoms, each of which may also be capable of independent existence. Among the large number of suitable rhodium components are, for example, those mentioned in the following list which, however, is by no means considered to be a limiting one with respect to the rhodium component of the catalyst.

| | |
|---|---|
| $RhCl_3 \cdot xH_2O$ | $Rh_2O_3 \cdot 5H_2O$ |
| $RhBr_3$ | $Rh_2(CO)_4Cl_2$ |
| $RhI_3$ | $Rh_2(CO)_4Br_2$ |
| $Rh(NO_3)_3 \cdot 2H_2O$ | $Rh_2(CO)_4I_2$ |
| $Rh_2O_3$ | $Rh_4(CO)_{12}$ |

The iodine-containing component of the catalyst is preferably HI, but it may be iodine itself or any iodine-containing compound such as alkyl iodides, for example, methyl iodide, ethyl iodide, and the like, aryl iodides such as phenyl iodide, or iodine salts, for example, sodium or potassium iodide, and ammoniumm iodide.

Any temperature between 100° and 190°C can be employed with the higher temperatures aiding removal of both carbon monoxide and hydrogen iodide from the spent catalyst solution. Pressuure employed may be either atmospheric or superatmospheric whichever may be required to maintain boiling conditions at the temperature of heating in an isothermal system.

When an alcohol is employed in the process, the mole ratio of alcohol to the iodine-containing component in the spent catalyst solution should be at least 1:1 and preferably, is in the range from about 4:1 to 20:1.

While the use of boiling conditions in an isothermal system is to be preferred, a closed reaction system can be employed. The latter technique, however, is not as effective at lower temperatures.

After the precipitation of the rhodium, the solution can be separated from the precipitated solids by centrifuging, filtration or other known techniques as well as by decantation as shown in the examples.

It will be readily apparent to those skilled in the art that the method of regeneration of spent catalyst disclosed herein can be applied in the separation of rhodium from admixture with other metals. If the rhodium is present in solid form as, for example, in an ore, the ore can be treated in known manner, for example, with hydrochloric acid solution, to solubilize the metals. Thereafter, the metal solution can be reacted with carbon monoxide in the presence of a halogen-containing component such as hydrogen iodide, alkyl iodide or the like to complex the rhodium metal therein. The resulting solution can then be treated in the manner described herein for regeneration of the rhodium-containing catalyst complex.

What is claimed is:

1. A process for the regeneration of a spent catalyst solution containing a soluble rhodium iodocarbonyl complex, hydrogen iodide, water, acetic acid and metallic corrosion products which comprises heating said spent catalyst solution with agitation at a temperature from about 100° to 190°C at a pressure sufficient to boil the solution for a period of time necessary to obtain a rhodium-containing precipitate from said solution and reduce the rhodium content of said solution to a predetermined level, separating the solid rhodium-containing precipitate from said liquid solution, adding a quantity of a solvent selected from the group consisting of water, acetic acid and mixtures thereof and an iodine-containing component selected from the group consisting of iodine, hydrogen iodide, alkyl iodides, aryl iodides and iodine salts to said rhodium-containing precipitate and heating the resulting mixture in contact with carbon monoxide while maintaining constant agitation until solution is effected.

2. The process of claim 1 wherein said liquid solution separated from said solid rhodium-containing precipitate is passed through a separator for removal of any finely divided solids contained therein and said finely divided solids are combined with said rhodium-containing precipitate.

3. The process of claim 1 wherein heating of said spent catalyst solution is effected at a temperature of at least 140° C and in the presence of an alkyl alcohol in which the alkyl group contains 1 to 5 carbon atoms, the amount of said alcohol being sufficient to provide a mole ratio of alcohol to hydrogen iodide in the spent catalyst solution of at least 1:1.

4. The process of claim 3 wherein said alcohol is methanol.

5. The process of claim 4 wherein the mole ratio of methanol to hydrogen iodide is in the range from about 4:1 to 20:1.

6. The process of claim 5 wherein methyl iodide vapors are condensed and added as the iodine-containing component to said rhodium-containing precipitate for converted it to an active catalyst.

* * * * *